United States Patent [19]

Caddell

[11] 4,198,699
[45] Apr. 15, 1980

[54] MASS MEMORY ACCESS METHOD AND APPARATUS

[75] Inventor: Richard W. Caddell, Brookfield, Wis.

[73] Assignee: Kearney & Trecker Corporation, West Allis, Wis.

[21] Appl. No.: 16,149

[22] Filed: Mar. 1, 1979

[51] Int. Cl.² .............................................. G11C 13/00
[52] U.S. Cl. ....................................... 365/230; 365/73; 365/222
[58] Field of Search ............... 365/230, 174, 189, 222, 365/73, 76

[56] References Cited

U.S. PATENT DOCUMENTS 4,130,894  12/1978  Merrill et al. .......................... 365/51

Primary Examiner—Terrell W. Fears
Attorney, Agent, or Firm—Cyril M. Hajewski

[57] ABSTRACT

A method and apparatus for transferring digital data between a mass memory and a random access memory. The mass memory has a plurality of memory loops, each having a plurality of memory cells, and a read/write device which either outputs data from the memory cells or inputs data to the memory cells. Each memory cell is identified by an address that specifies its place in the loop sequence starting from a reference cell. A loop position counter is set at zero when the reference cell of the selected memory loop is at the read/write device. The loop position counter is advanced by one count each time the next memory cell in the sequence is moved into operative relationship with the read/write device. Transfer of data between the mass memory and the random access memory is accomplished without any delay under the control of a random access memory address counter which is synchronized with the loop position counter. A transfer counter terminates the data transfer when an entire data loop has been transferred into or out of the mass memory. Since the loop position counter and random access memory address counter are synchronized, the transferred data will be written into the correct memory cells in either memory regardless of which mass memory cell is in operative relationship with the read/write device at the time the data transfer is initiated. Thus, this invention eliminates latency time in the transfer of data between a mass memory and a random access memory.

4 Claims, 3 Drawing Figures

MASS MEMORY ACCESS METHOD AND APPARATUS

BACKGROUND OF THE INVENTION

This invention relates to a method and apparatus for transferring digital data between a mass memory, such as a magnetic disc, charge coupled device, or magnetic bubble memory, and a random access memory. Mass memories contain a plurality of loops or tracks which are each composed of a closed sequence of memory cells. Each memory cell contains one bit of binary data. The cells of each loop circulate one at a time past a corresponding read/write device which either outputs data from the memory cells or inputs data to the memory cells. Each cell is identified by an address that specifies its place in the loop sequence starting from a reference cell. A loop position counter is set at zero when the reference cell is at the read/write device and the loop counter is advanced by one count each time a new memory cell is moved into operative relationship with the read/write device. The loop position counter contains the same number of steps in its counting cycle as there are memory cells in the memory loop. Thus, the number that is in the loop position counter at any time is the address of the memory cell that is in operative relationship with the read/write device at the same time.

In the past, to read data from the mass memory or write data into the mass memory, it was necessary to specify the desired loop and cell number (or numbers) and then to wait until the specified cell or cells moved into operative relationship with the read/write device. The time delay from the moment that the desired loop and cell number are specified to the time when the desired cell moves into operative relationship with the read/write device is called the latency time. The latency time for any given memory cell can range from zero, if the desired cell is in operative relation with the read/write device immediately after the desired cell is specified, to the time that it takes a cell to circulate completely around the loop.

The principle object of this invention is to provide a mass memory access method and apparatus which completly eliminates latency time and makes it possible to transfer digital data into and out of a mass memory without waiting for the desired cell to circulate into operative relationship the read/write device.

SUMMARY OF THE INVENTION

In accordance with this invention, the first step in the transfer of data between a mass memory and a random access memory is to select the desired loop in the mass memory. Next, the address counter of the random access memory is set to the same state as the loop position counter of the mass memory regardless of whether or not the desired memory cell is in operative relationship with the read/write device. Then, the transfer of data between the mass memory and the random access memory commences immediately, the loop position counter and random access address being advanced by one count each time a new memory cell moves into operative relationship with the read/write device of the mass memory. When the entire loop has circulated past the read/write device, the data transfer process is terminated. At that time, all of the data in the loop will have been transferred into the random access memory, or the loop will have been filled with data from the random access memory.

In the apparatus of this invention, the random access address counter has the same number of steps in its counting cycle as the loop position counter of the mass memory. Therefore, there will always be a one-to-one correspondence between the addresses of data in the mass memory and in the random access memory.

The apparatus of this invention includes a transfer counter which has the same number of steps in its counting cycle as the number of memory cells in each loop of the mass memory. The transfer counter is set to zero at the start of the data transfer operation and is advanced by one step each time a bit of data is transferred between the mass memory and the random access memory. When the transfer counter reaches the end of its count, the data transfer process is terminated.

DETAILED DESCRIPTION OF THE INVENTION

Figure 1:
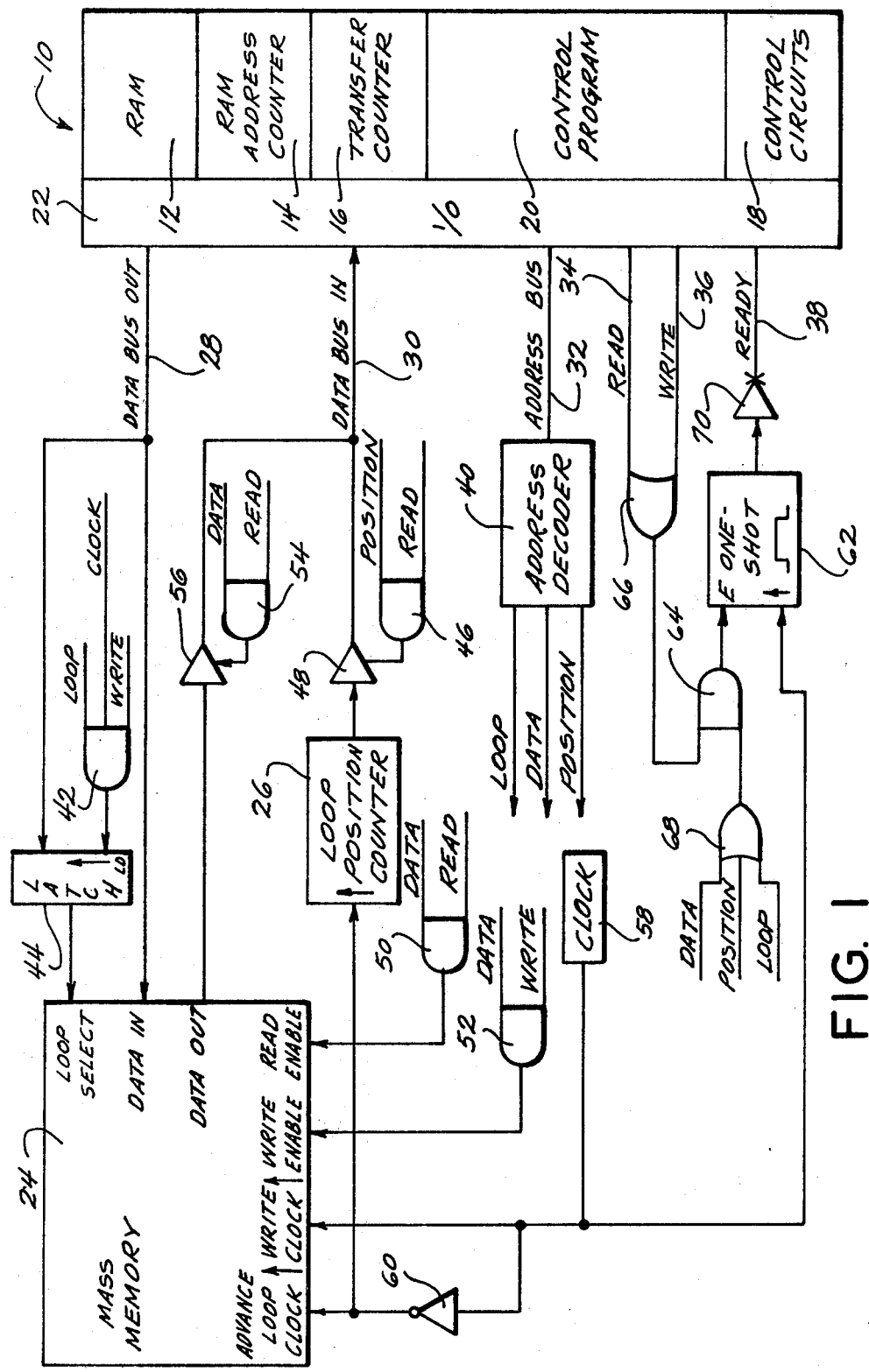
FIG. 1 is a block diagram of a first embodiment of the invention.

Referring to FIG. 1, a general purpose digital computer 10 has at least one random access memory (RAM) 12 along with a RAM address counter 14, a transfer counter 16, control circuits 18, and a control program 20. Computer 10 can be any suitable general purpose digital computer such as the PDP-8E computer manufactured by the Digital Equipment Corporation of Maynard, Mass. Computer 10 includes suitable input/output (I/O) circuits 22 which connect the various computer circuits with peripheral devices (not shown) and with the data transfer apparatus of this invention.

In this embodiment of the invention, data is transferred between RAM 12 and a mass memory 24 which can be magnetic disc memory, charge coupled device memory, magnetic bubble memory, or any other suitable mass memory which has a plurality of memory loops which each contain a closed sequence of memory cells. In this particular example, each loop of mass memory 24 has 256 memory cells which are numbered in sequence from 0 to 255. Any desired loop can be selected by applying a digital number which signifies the desired loop to a LOOP SELECT input of mass memory 24. The memory cells of the selected loop are circulated past the read/write device therefor (not shown) in response to clock signals applied to an ADVANCE LOOP CLOCK input. The clock signals applied to the ADVANCE LOOP CLOCK input are also applied to a loop position counter 26 so as to advance counter 26 by one count each time a new memory cell is advanced into operative relationship with the read/write device for the selected loop. Loop position counter 26 has the same number of steps in its counting cycle as there are memory cells in the memory loops. Loop position counter 26 is set to zero when memory cell number zero is at the read/write device. Therefore the state of loop position counter 26 at any given time corresponds to the address of the memory cell which is in operative relationship with the read/write device.

Mass memory 24 also has a WRITE CLOCK, WRITE ENABLE, READ ENABLE, and DATA IN input and a DATA OUT output. These functions are well-known and will not be described further.

The arrows beside the ADVANCE LOOP CLOCK, WRITE CLOCK and LOOP POSITION COUNTER inputs signify that the circuit is triggered by the rising edge of the clock pulse, i.e. the 0 to 1 transition.

The conductors which are coupled between computer 10 and the apparatus of this invention include a DATA BUS OUT 28, which consists of a plurality of conductors (one for each bit of data, DATA BUS IN 30, also a plurality of conductors, an ADDRESS BUS 32, another plurality of conductors, a READ conductor 34, a WRITE conductor 36, and a READY conductor 38.

The ADDRESS BUS conductors 32 are coupled to an address decoder circuit 40 which receives a two bit address word from computer 10 and decodes the address word to produce one of three output signals: LOOP, DATA and POSITION. When a loop is to be selected in mass memory 24, the address which signifies LOOP is applied to ADDRESS BUS 32 by control program 20. The resulting LOOP signal is applied to AND gate 42 which also receives a WRITE signal input and a CLOCK input. When LOOP, WRITE and CLOCK are simultaneously in the high state, the output of gate 42 goes high and clocks the input of a latch 44 which is coupled between the DATA BUS OUT 28 and the LOOP SELECT input of mass memory 24. When latch 44 is clocked it applies the loop number which is then present on DATA BUS OUT 28 to the LOOP SELECT input.

The POSITION signal output of decoder 40 is applied to AND gate 46 which also receives a READ signal input. When POSITION and READ are simultaneously high, the output of AND gate 46 enables a set of tri-state transmission gates 48, only one of which is shown in FIG. 1. When gates 48 are enabled, the state of loop position counter 26 is applied to DATA BUS IN 30. This number is utilized by control program 20 to set RAM address counter 14 to the same state as loop position counter 26. RAM address counter 14 has the same number of steps in its counting cycle as loop position counter 26.

The DATA output signal of address decoder 40 is applied to AND gates 50 and 52, which also receives READ and WRITE inputs, respectively. The output of gate 50 is coupled to the READ ENABLE input of mass memory 24 and the output of gate 52 is coupled to the WRITE ENABLE thereof.

The DATA and READ signals are also applied to AND gate 54 whose output is coupled to the enable input of a set of tri-state transmission gates 56, only one of which is shown in FIG. 1. When gates 56 are enabled, they couple the DATA OUT of mass memory 24 to the DATA BUS IN conductors 30 for transmission to computer 10.

The addresses for the LOOP, DATA and POSITION signals and the READ and WRITE signals are generated by computer control circuits 18.

The embodiments of FIG. 1 is clocked by a conventional clock circuit 58 whose output is coupled to the WRITE CLOCK input of mass memory 24 and is coupled via inverter 60 to the ADVANCE LOOP CLOCK input thereof. The output of clock 58 is also applied to the trigger input of a one-shot multivibrator 62.

One-shot multivibrator 62 is enabled by the output of AND gate 64. One input of AND gate 64 is coupled to the output of OR gate 66, which receives READ and WRITE inputs from conductors 34 and 36, and the other input of AND gate 64 is coupled to the output of OR gate 68, which receives DATA, POSITION and LOOP input signals. The output of one-shot multivibrator 62 is applied through inverter 70 to READY conductor 38.

The operation of this embodiment of the invention will be explained by detailing the sequence of operation required to select a loop in mass memory 24, to transfer data from the selected loop to RAM 12, and to transfer data from RAM 12 to the selected loop. The loop selection sequence is as follows:
1. Put the loop number to be selected on the DATA BUS OUT 28.
2. Put the LOOP strobe address on ADDRESS BUS 32.
3. Put WRITE line 36 high.
4. Wait for READY line 38 to go low.
5. Clock the loop number on DATA BUS OUT 28 into loop select latch 44.
6. On the next high transition of the clock, send the $\overline{\text{READY}}$ pulse.
7. Put WRITE line 36 low.
8. Done.

The sequence for transferring data from mass memory 24 to RAM 12 is as follows:
1. Reset transfer counter 16.
2. Put the POSITION strobe address on ADDRESS BUS 32.
3. Put READ line 34 high.
4. Wait for $\overline{\text{READY}}$ line 38 to go low.
5. Put the loop position counter number on DATA BUS IN 30.
6. On next high transition of the clock, send $\overline{\text{READY}}$ pulse.
7. Input the loop position number from DATA BUS IN 30.
8. Put READ line 34 low.
9. Take loop position number off DATA BUS IN 30.
10. Set RAM address counter 14 equal to the loop position number.
11. Put DATA strobe address on ADDRESS BUS 32.
12. Put READ line 34 high.
13. Wait for $\overline{\text{READY}}$ line 38 to go low.
14. Put loop data on DATA BUS IN 30.
15. On next high transition of the clock send $\overline{\text{READY}}$ pulse.
16. Input loop data from DATA IN BUS 30.
17. Put READ line 34 low.
18. Take loop data off DATA BUS IN 30.
19. Write loop data into RAM 12 at current address of RAM address counter 14.
20. Increment RAM address counter 14.
21. Increment transfer counter 16, which has the same number of steps in its counting cycle as loop position counter 26 and RAM address counter 14.
22. If transfer counter 16 has not overflowed, go to step 11. If transfer counter 16 has overflowed, go to step 23.
23. Done.

The sequence for transferring data from RAM 12 to mass memory 24 is as follows:
1. Reset transfer counter 16.
2. Put the POSITION strobe address on ADDRESS BUS 32.
3. Put READ line 34 high.

4. Wait for READY line 38 to go low.
5. Put the loop position number on DATA BUS IN 30.
6. On next high transition of the clock, send READY pulse.
7. Input the loop position number from DATA BUS IN 30.
8. Put READ line 34 low.
9. Take the loop position number off DATA BUS IN 30.
10. Set RAM address counter 14 equal to the loop position number.
11. Read data from RAM 12 at address of RAM address counter 14.
12. Put RAM data read in step 11 on DATA BUS OUT 28.
13. Put DATA strobe address on ADDRESS BUS 32.
14. Put WRITE line 36 high.
15. Wait for READY line 38 to go low.
16. On the next high transition of the clock, write RAM data on DATA BUS OUT 28 into loop and send READY pulse on line 38.
17. Increment RAM address counter 14.
18. Increment transfer counter 16.
19. If transfer counter 16 has not overflowed, go to step 11. If transfer counter 16 has overflowed, go to step 20.
20. Done.

Figure 3:
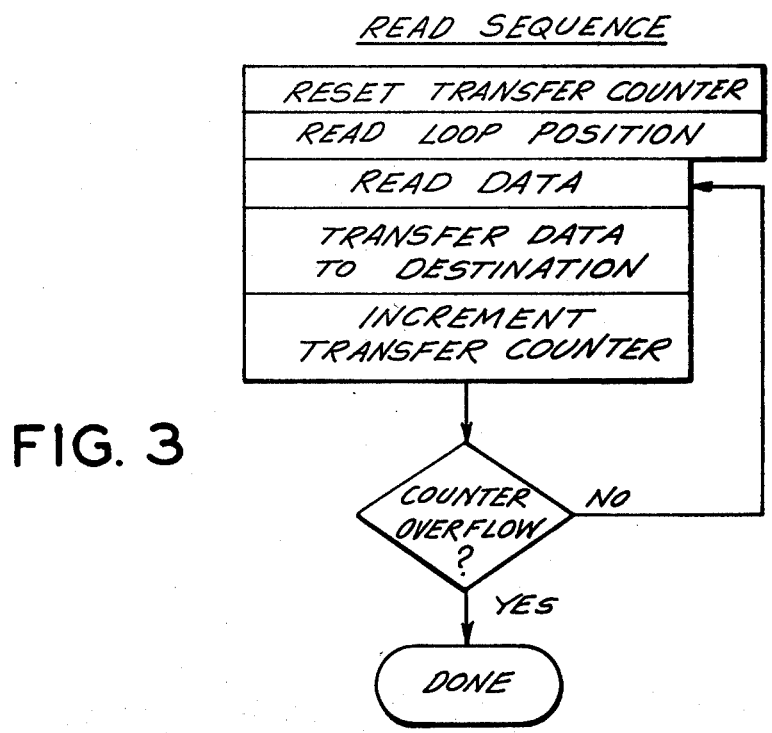
FIG. 3 is a flow chart of the read sequence and write sequence for the embodiments of FIGS. 1 and 2.
Figure 3:
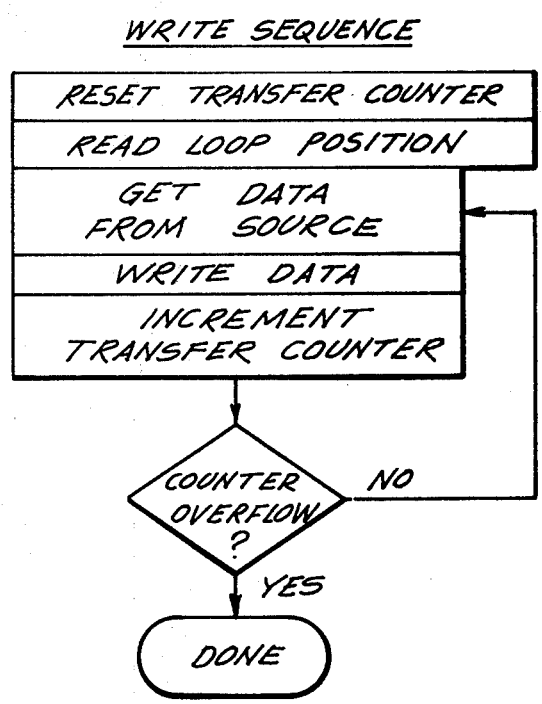

In the embodiment of FIG. 1, the foregoing sequences are implemented by a combination of hardware and software, the hardware being the gates, counter, latch, decoder and one-shot multivibrator shown in FIG. 1, and the software being included in control program 20. In the loop selection sequence, steps 1 to 4, 7 and 8 are included in control program 20. In the transfer of data from mass memory 24 to RAM 12, steps 1 to 4, 7, 8, 10 to 13, 16, 17 and 19 to 23 are included in control program 20. In the transfer of data from RAM 12 to mass memory 24, steps 1 to 4, 7, 8, 10 to 13 and 17 to 20 are included in control program 20. Flow charts for the steps which constitute part of control program 20 are shown in FIG. 3 and can be written in machine language for the PDP-8E computer with reference to the PDP-8 handbook entitled: "INTRODUCTION TO PROGRAMMING", published by the Digital Equipment Corporation of Maynard, Mass., in May, 1972. The entire contents of the above-noted handbook are hereby incorporated herein by reference.

In the embodiment of FIG. 1, the timing of the data transfer operation is controlled by clock 58. This works well if the clock for computer 10 is close to the frequency of clock 58, but if the computer's clock is slower than clock 58 it can lose synch, and if the computer's clock is faster than clock 58, the computer will be waiting part of the time. In these cases, it is better to utilize the modified timing circuit illustrated in FIG. 2.

Figure 2:
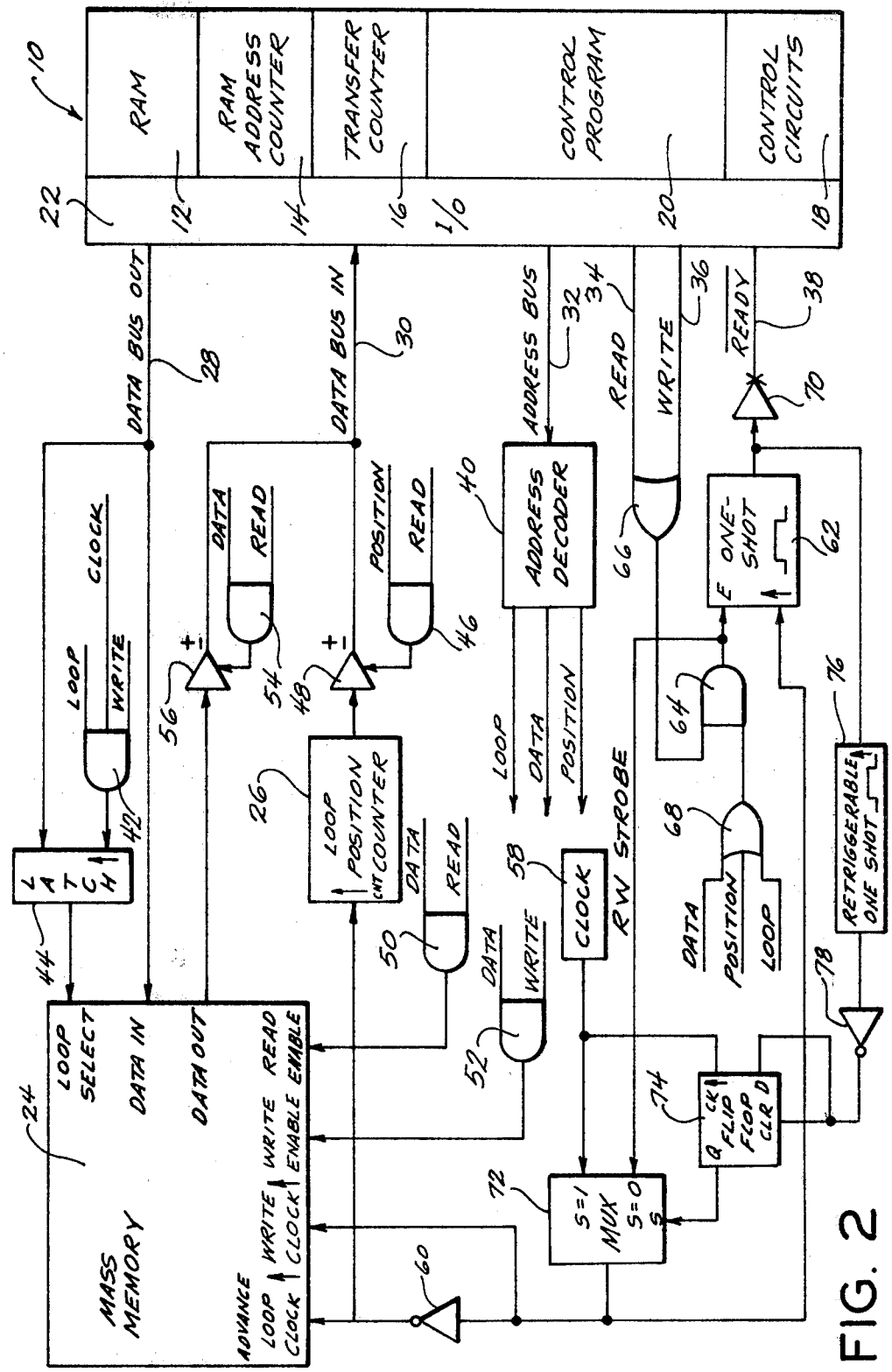
FIG. 2 is a block diagram of a second embodiment of the invention.

Referring to FIG. 2, the output of clock 58 is coupled to one input of a two-to-one multiplexer 72 whose other input is coupled to the output of AND gate 64. In the S=1 state of multiplexer 72, the output of clock 58 appears on the output thereof, while in the S=0 state of multiplexer 72, the output of gate 64 (called the RW STROBE) appears on the output of multiplexer 72. The switching of multiplexer 72 is controlled by a D type flip-flop 74 whose Q output is coupled to the S input of multiplexer 72. Flip-flop 74 is clocked by clock 58 and has its D and CLEAR inputs coupled to the output of retriggerable one-shot multivibrator 76 through an inverter 78. The trigger input of retriggerable one-shot multivibrator 76 is coupled to the output of one-shot multivibrator 72.

When there is no data transfer in progress, flip-flop 74 is set and multiplexer 72 is in the S=1 state which couples the output of clock 58 to mass memory 24, loop position counter 26, and one-shot multivibrator 62. When one-shot multivibrator 62 is triggered, it triggers one-shot multivibrator 76 which resets flip-flop 74 and switches multiplexer 72 to the S=0 condition, which substitutes the output of gate 64 (RW STROBE) for clock 58. As long as the data transfers occur often enough to keep retriggerable one-shot multivibrator 76 fired, mass memory 24 will stay in synch with computer 10. The time period of retriggerable one-shot multivibrator 76 is longer than the time lapse between transfer of individual bits of data from the selected loop. When the data transfer operation is terminated, retriggerable one-shot multivibrator 76 will time out and reset flip-flop 74, thus switching clock 58 back in the circuit.

The only timing restraint on the asynchronous embodiment of FIG. 2 is that READ line 34 and WRITE line 36 stay high and low for the minimum high and low time of mass memory 24 and that retriggerable one-shot multivibrator 76 times out before the maximum refresh period of mass memory 24.

When a Digital Equipment Corporation PDP-8E is used for computer 10, I/O 22 can be a DKCB-AA (option board #1) Module No. M8360 which has 12 bits of data input (D IN) and 12 bits of data output (D OUT). The following assignments are made for the 12 bits of data input: bit 0=READY, bits 1 to 3=SPARE, and bits 4 to 11=DATA BUS IN. The following assignments are made for the 12 bits of data output: Bit 0=READ, bit 1=WRITE, bits 2 and 3=ADDRESS, and bits 4 to 11=DATA BUS OUT.

Although the foregoing description describes data transfers involving a single memory loop in mass memory 24, it will be obvious to those skilled in the art that memory loops can be put in parallel for different word sizes. For example, with the PDP-8E data in and data out bit assignments noted above, eight loops could be paralleled to provide an eight bit word, every transfer to be written into or read out of 256 by eight bit RAM.

In the foregoing description, RAM 12 has the same capacity as the loops of mass memory 24. However, the capacity of RAM 12 can be larger than that of mass memory 24 if desired. In this case, a base register is appended to RAM address counter 14 to provide a larger address. For example, suppose data from a 256 position mass memory loop is to be transferred to 256 locations in a 65,536 location RAM, startin at location $(1000)_{16}$ and ending at location $(10FF)_{16}$. For this purpose an eight bit base register is appended to eight bit RAM address counter 14 to provide a sixteen bit address. By changing the base address, the data from mass memory 24 can be transferred to any desired 256 location block of RAM 12. Another advantage of this method is that interleaving data to keep latency to a minimum when transferring more than one loop is not necessary.

Although the illustrative embodiments of the invention have been described in considerable detail for the purpose of fully disclosing a practical operative structure incorporating the invention, it is be understood that the particular apparatus shown and described is intended to be illustrative only and that the various novel features of the invention may be incorporated in other structural forms without departing from the spirit and scope of the invention as defined in the sub-joined claims.

The principles of this invention having now been fully explained in connection with the foregoing, I hereby claim as my invention:

1. A method of transferring digital data between a mass memory having a plurality of storage loops and having a loop position counter associated therewith and a random access memory having an address counter associated therewith, each of said storage loops having a capactiy to store N bits of digital data, and both of said counters having N steps in their counting cycle, said method comprising the steps of:
   (A) selecting at least one storage loop in said mass memory which contains the data to be transferred to said random access memory or which is the destination for data to be transferred from said random access memory;
   (B) setting said random access address counter to the same state as said loop position counter regardless of which step said loop position counter is at in its counting cycle;
   (C) transferring the bit of digital data which corresponds to the current state of both counters from one memory to the other;
   (D) advancing both counters by one step in their counting cycle; and
   (E) repeating steps (C) and (D) until N bits of digital data have been transferred from one memory to the other.

2. Apparatus for transferring digital data between a mass memory having a plurality of storage loops and having a loop position counter associated therewith and a random access memory having an address counter associated therewith, each of said storage loops having a capacity to store N bits of digital data, and both of said counters having N steps in their counting cycle, said apparatus comprising:
   a transfer counter having N steps in its counting cycle;
   a clock coupled to the clock input of said mass memory and to said loop position counter;
   means for generating a READ signal indicating that data is to be read out of said mass memory;
   means for generating a WRITE signal indicating that data is to be written into said mass memory;
   means for generating a LOOP signal indicating that a loop is to be selected in said mass memory;
   means for generating a DATA signal indicating that data is to be transferred between said mass memory and said random access memory;
   means for generating a POSITION signal indicating that the output of said loop position counter is to be read;
   a one-shot multivibrator having an enable input and a trigger input and an output; and
   means for applying a trigger input to said one-shot multivibrator when one of said READ or WRITE signals is true and one of said DATA, LOOP or POSITION signals is true.

3. The apparatus according to claim 2 wherein said mass memory has a READ ENABLE input and a WRITE ENABLE input, and also comprising:
   means for triggering said READ ENABLE input when said READ and said DATA signals are ture; and
   means for triggering said WRITE ENABLE input when said WRITE and said DATA signals are true.

4. The apparatus according to claim 2 and also comprising:
   a two-to-one multiplexer having two signal inputs;
   a control input and an output, the output of said multiplexer being coupled to the clock input of said mass memory, one signal input of said multiplexer being coupled to the output of said clock, said trigger input of said one-shot multivibrator being coupled to the other signal input of said multiplexer, and the output of said one-shot multivibrator being coupled to the control input of said multiplexer.

* * * * *